Dec. 4, 1923.
R. L. NAUGLE
1,476,212
SHOCK ABSORBER
Filed Oct. 4, 1922
2 Sheets-Sheet 2
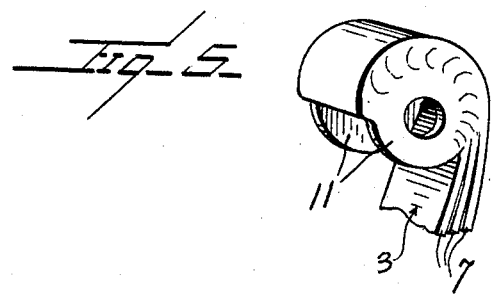
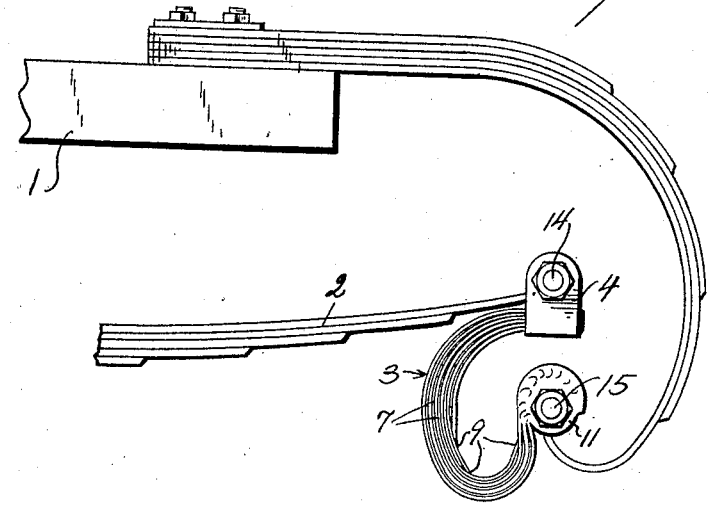
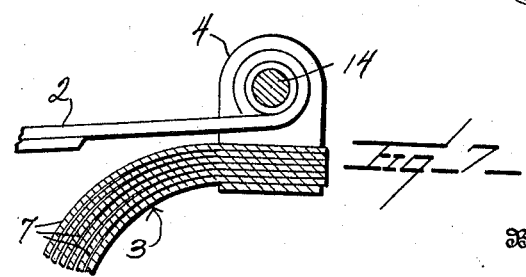
Inventor
R. L. Naugle
By Watson E. Coleman
Attorney Patented Dec. 4, 1923.

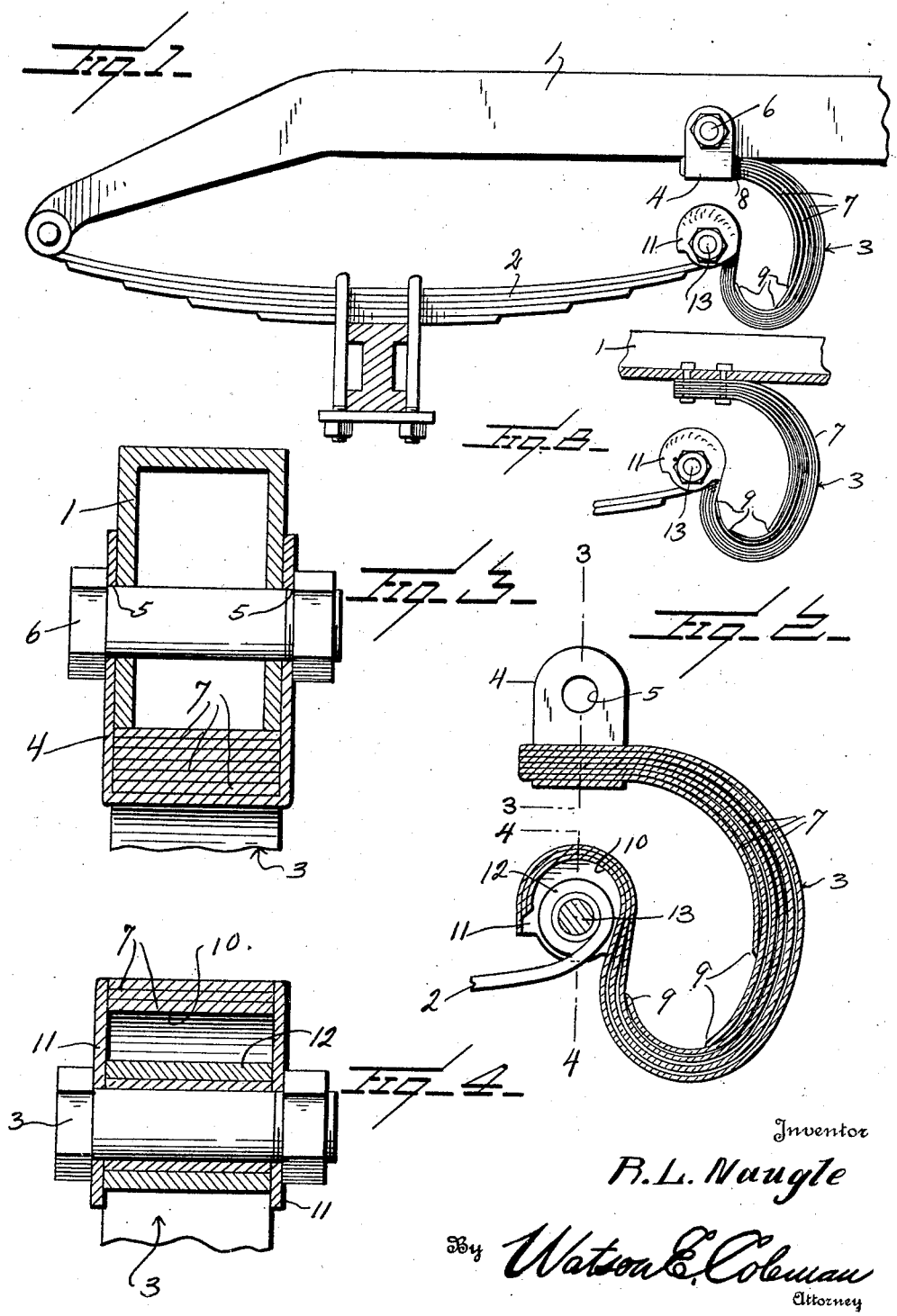

1,476,212

UNITED STATES PATENT OFFICE.

ROY L. NAUGLE, OF BLACKSTONE, VIRGINIA.

SHOCK ABSORBER.

Application filed October 4, 1922. Serial No. 592,323.

*To all whom it may concern:*

Be it known that I, ROY L. NAUGLE, a citizen of the United States, residing at Blackstone, in the county of Nottoway and State of Virginia, have invented certain new and useful Improvements in Shock Absorbers, of which the following is a specification, reference being had to the accompanying drawings.

The present invention has for its purpose to provide a device of this character adapted to replace the usual spring shackle heretofore employed for securing the ends of a spring to the frame of an automobile or to a second spring.

To those familiar with the art it is well known that the bearings of the shackle and the spring become considerably worn due to the constant motion of the spring and the shackle, thus affording play and causing rattling during the operation of the automobile and often squeaking noises which are objectionable. It is also known that the spring shackles must be constantly oiled in order to prevent too rapid wear thereon, and are often neglected due to their inaccessibility.

Therefore, another purpose is to provide an auxiliary spring device or shock absorber, which may be attached to the frame of the automobile or to a second spring, and which at the same time will provide for and allow of the usual movement of the spring during its operation.

Still another purpose is to provide a shock absorber in substitution for the usual form of spring shackle comprising a plurality of spring leaves, which decrease in their respective lengths from where they are attached to the automobile frame, in a direction toward where certain of the leaf springs are connected to the usual automobile spring or second spring.

A further purpose is to provide a shock absorber of strength and durability, and so constructed and attached to the automobile frame, as to permit of the flexibility of such point of connection, in order to compensate for rotary motion of the end of the spring as it vibrates forwardly and rearwardly.

A still further purpose is the provision of a shock absorber of this character comprising a plurality of spring leaves suitably spaced at points inward where the leaves are fastened to the frame of the automobile or to a spring and where the other ends of the spring leaves terminate or attach, thereby avoiding friction between the leaves as well as avoiding the use of lubrication, and thereby insuring resiliency of the body of the automobile.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1 is a view in elevation showing one application of the improved shock absorber, wherein it is connected between the frame of the automobile and the spring;

Figure 2 is a sectional view through the shock absorber;

Figure 3 is a cross sectional view on line 3—3 of Figure 2;

Figure 4 is a sectional view on line 4—4 of Figure 2;

Figure 5 is a detail perspective view of the lower end of the shock absorber, which connects to the spring shown in Figure 1;

Figure 6 is a view in elevation showing the shock absorber connected to the automobile spring and in turn to a second spring;

Figure 7 is a sectional view of the end of the shock absorber where it is connected to the spring 2 in Figure 6;

Figure 8 is a detail view of a shock absorber connected at one end to a spring 2, the opposite ends of the leaves of said shock absorber being shown in section as bolted direct to the frame which is in section;

Referring to the drawings, 1 designates the frame of the automobile, as shown in Figures 1 and 2 and 2 the usual automobile spring, which is mounted upon the usual axle.

The shock absorber 3 used for replacing the usual spring shackle has attached to one end thereof by means of welding, brazing or by any other suitable means a U-shaped plate or bracket 4. As shown in Figure 1 the side ears of this bracket are provided with openings 5 to receive a bolt 6, whereby the plate or bracket may move or flex relatively to the frame, the bolt passes through the frame, and acts to attach the bracket or plate in position.

The shock absorber comprises a plurality of leaf spring 7, and where they merge together at their upper portions, they are welded, one to the other or otherwise connected, and in turn welded or otherwise connected at 8 to the U-shaped plate or bracket.

The leaf springs are suitably spaced, and certain of these leaf springs are short and have their free ends welded to the adjacent springs as shown at 9. The longer leaf springs at the lower end of the shock absorber terminate in and cause to be formed a substantially semi-circular or arcuate wall 10, there being end plates or walls 11 forming a part of the substantially semi-circular or arcuate wall 10, thereby providing a socket for the reception of the end of the automobile spring. The end of said automobile spring terminates in a roll 12, through which a bolt 13 (which also passes through the end walls of the socket) passes, thereby operatively connecting the shock absorber to the automobile spring. As will be noted other of said leaf springs of the shock absorber gradually increase in length, from where they are attached by welding to the U-shaped plate or bracket. These springs of different lengths are attached to each other where they terminate, and since the springs are spaced, friction between the springs as well as lubrication thereto are avoided.

As shown in Figures 5 and 6 the shock absorber is simply reverse to that shown in Figures 1 and 2, and in this case the U-shaped plate or bracket is bolted at 14 to the automobile spring, while the socket end of the shock absorber is bolted at 15 to a second spring, which, as shown, is supported and connected to the frame of the automobile.

The present form of device avoids friction between the leaves of the shock absorber, as well as dispensing with lubrication. Furthermore the pivotal connections between the automobile spring and auxiliary spring as well as the pivotal connections of the heretofore used shackles are dispensed with. Also the present device compensates for the elongation and contraction of the automobile spring under compression and expansion, due to the compression and expansion of the auxiliary or second spring, instead of depending upon the rotary motion of the usual shackle around the shackle bolts. Furthermore since the U-shaped plates or brackets are constructed of soft iron the plates are permitted to draw close against the automobile frame or body saddle or perch, or spring, so as to brace the joint laterally and thereby render the usual side play on the auxiliary spring impossible. The present device is more positive and stable in operation.

On some makes of automobiles perches are used on the frame for the purpose of fastening the ends of the springs thereto, and to utilize the present form of shock absorber as attached to a perch depending from the under part of the frame would dispose the body of the car too high, and necessarily space the frame from the upper part of the present form of shock absorber, therefore in order to save this space and obviate the disposing of the frame of the car too high, the upper ends of the leaves (which are welded, brazed or spot welded together) of the present form of shock absorber, may be bolted direct to the frame as at 4ª in Figure 8.

The invention having been set forth, what is claimed is:—

A combined spring shackle and shock absorber for operative connection to a vehicle spring, comprising a plurality of leaf springs having their upper ends merging toward and connected one to the other, a U-shaped plate or bracket connected to the joined ends of the leaf springs and having ears adapted for attachment to a spring or to an automobile frame, the outer leaf springs merging toward and welded one to the other at the other end of the shackle or shock absorber, said welded together ends terminating in a semi-cylindrical wall, the end walls being connected to the semi-cylindrical wall, thereby causing to be formed a socket for the reception of the end of a vehicle spring, the innermost leaf springs gradually increasing in their length, and being connected one to the other where they terminate, all of said leaf springs being spaced between their connected ends, thereby avoiding friction and eliminating lubrication.

In testimony whereof I hereunto affix my signature.

ROY L. NAUGLE.